US005593330A

United States Patent [19]

Kobayashi

[11] Patent Number: 5,593,330

[45] Date of Patent: Jan. 14, 1997

[54] LOCK SYSTEM FOR A WATERCRAFT

[75] Inventor: Noboru Kobayashi, Iwata, Japan

[73] Assignee: Yamaha Hatsudoki Kabushiki Kaisha, Iwata, Japan

[21] Appl. No.: 347,857

[22] Filed: Dec. 1, 1994

[51] Int. Cl.$^{6}$ ........................ B60K 41/00

[52] U.S. Cl. ........................ 440/84; 440/85

[58] Field of Search ........................ 440/84, 85, 38, 440/86, 87; 114/270

[56] References Cited

U.S. PATENT DOCUMENTS 3,786,892 1/1974 Horton ........................ 440/84

5,171,171 12/1992 Tani ........................ 440/84

OTHER PUBLICATIONS

M & E Marine Supply Company Catalog 1988, p. 178, Camden, New Jersey. Oct. 1988.

*Primary Examiner*—Stephen Avila

*Attorney, Agent, or Firm*—Knobbe, Martens, Olson & Bear

[57] ABSTRACT

A number of embodiments of personal watercraft having safety switches for enabling a kill switch if the operator falls overboard. In addition, a key-operated waterproof main switch is provided in the circuit to facilitate locking and to avoid drainage of the battery when not in use. A number of mounting arrangements for assuring further watertightness are also disclosed.

17 Claims, 9 Drawing Sheets

LOCK SYSTEM FOR A WATERCRAFT

BACKGROUND OF THE INVENTION

This invention relates to a lock system for a watercraft, and more particularly to an improved combined lock and safety system for a watercraft.

There is a very popular type of small watercraft commonly referred to as a "personal watercraft" in which the rider normally rides on, rather than in, the watercraft. These personal watercraft are quite sporting in nature and frequently are operated by the rider and his passengers, if any, in swimming suits. Thus, it is expected by the rider and the occupants that they may fall from the watercraft into the body of water in which it is operating.

It has been proposed to provide a safety switch which will deactivate the engine ignition system, for example, by closing a kill switch, if the rider falls off of the watercraft. One way in which these types of safety switches operate is that the rider wears a cuff that is connected by a cable to a switch. If the rider falls off, the switch is closed and the kill circuit energized for stopping the engine.

Although this type of arrangement is very effective for safety purposes, it has certain disadvantages. First, when the kill switch is actuated, the battery may be discharged. Furthermore, if the operator uses the safety switch as a device for ensuring against theft, the watercraft may be stolen by manually positioning the safety switch in a condition wherein the watercraft can be restarted through the use of a tool.

It is, therefore, a principal object of this invention to provide an improved lock system for a watercraft.

It is a further object of this invention to provide an improved lock system for a personal watercraft that embodies a safety switch but also incorporates a main key-operated switch so as to de-energize the battery and prevent theft.

When a main switch is utilized with this type of watercraft, there is a problem in that the main switch may either become submerged or alternatively can ingest a large amount of water. As noted above, due to the sporting nature of these watercraft, the presence of a large amount of water is quite likely.

It is, therefore, a still further object of this invention to provide an improved main switch for a watercraft and method of waterproofing it.

SUMMARY OF THE INVENTION

A first feature of the invention is adapted to be embodied in a control for a watercraft comprising a hull having a passenger's area for accommodating a rider. A battery for supplying electrical power to the watercraft is carried in the hull. A safety switch is coupled to a rider for disabling a circuit from the battery if a rider leaves the passenger's area and a key-operated main switch is providing for selectively precluding the supply of electrical power from said battery to said circuit.

Another feature of the invention is adapted to be embodied in a waterproof key-operated main switch for the electrical control circuit of a watercraft. The switch includes an outer housing having a pair of terminals for interposition in an electrical circuit. The outer housing defines an internal cavity in which a contact member is supported for movement between an open position wherein the terminals are out of electrical contact with each other and a closed position wherein an electrical circuit is formed between said terminals. The outer housing defines an aperture that receives a movable seal member that is adapted to engage the contact member for moving the contact member between its positions. A key-operated actuating member is provided in the housing for moving the moveable seal member in response to the insertion and turning of a key in the key-operated lock.

DETAILED DESCRIPTION OF THE PREFERRED EMBODIMENTS OF THE INVENTION

Figure 1:
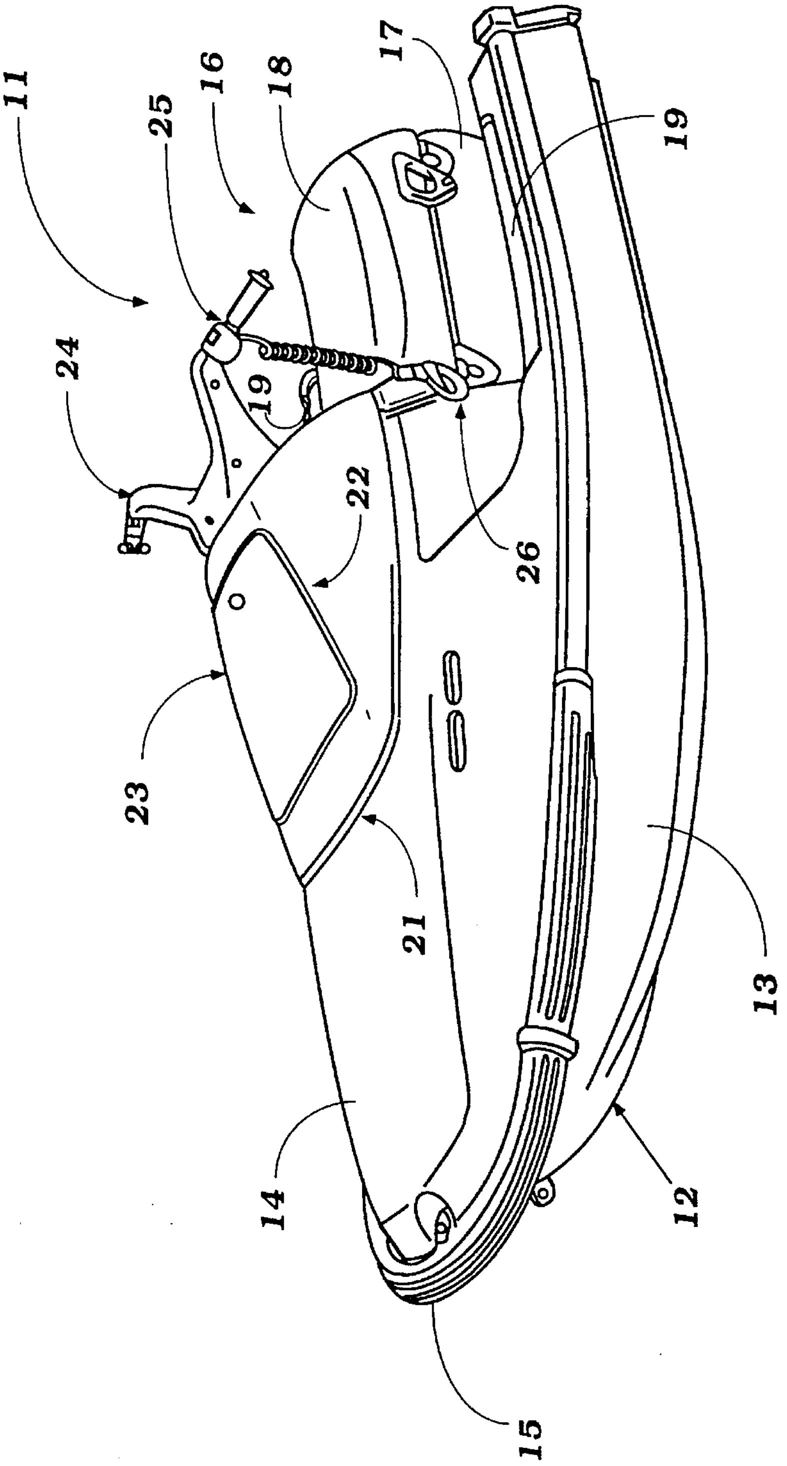
FIG. 1 is a perspective view of a small watercraft constructed in accordance with a first embodiment of the invention taken from the front and to one side.
Figure 2:
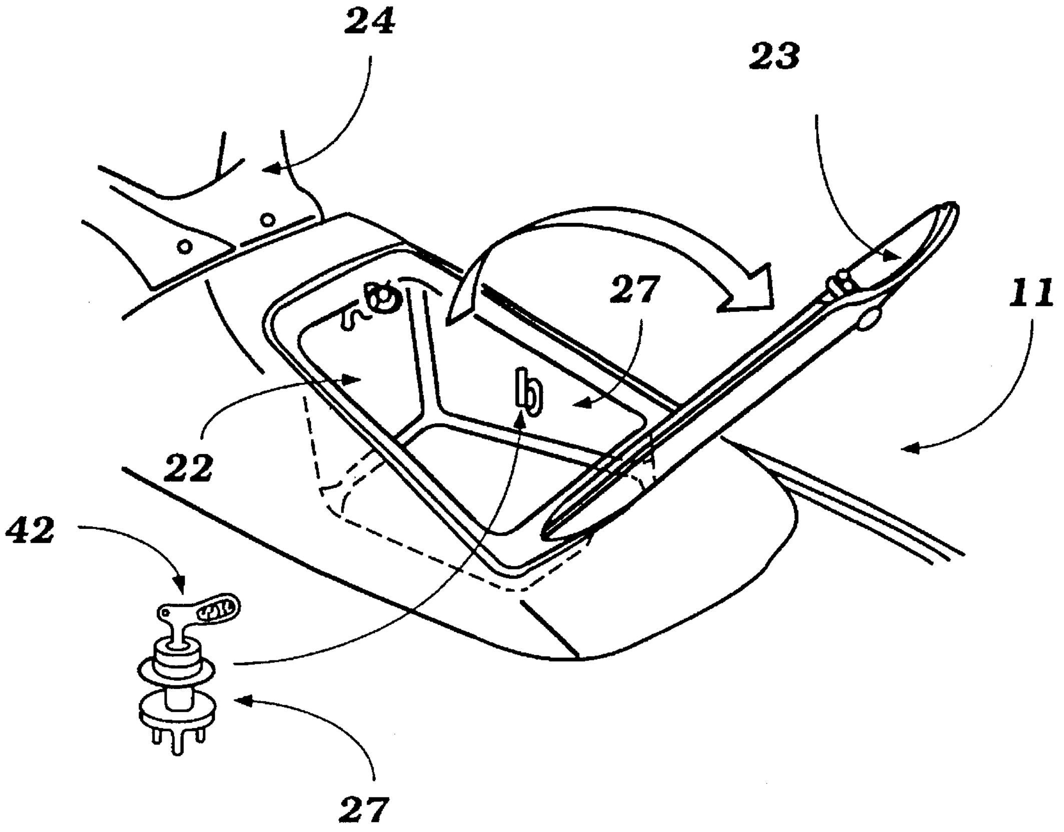
FIG. 2 is a perspective view, looking from the side opposite that of FIG. 1, and shows a storage compartment in an open position and the key-operated main switch both in position and withdrawn and shown in perspective to more clearly show its construction.
Figure 3:
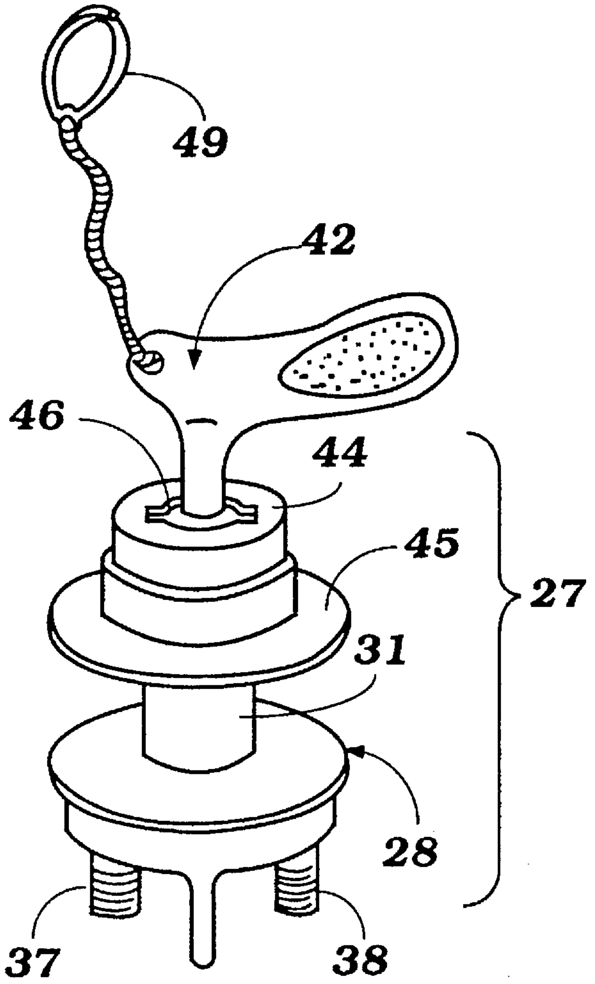
FIG. 3 is an enlarged perspective view of the main switch as shown in FIG. 2.
Figure 4:
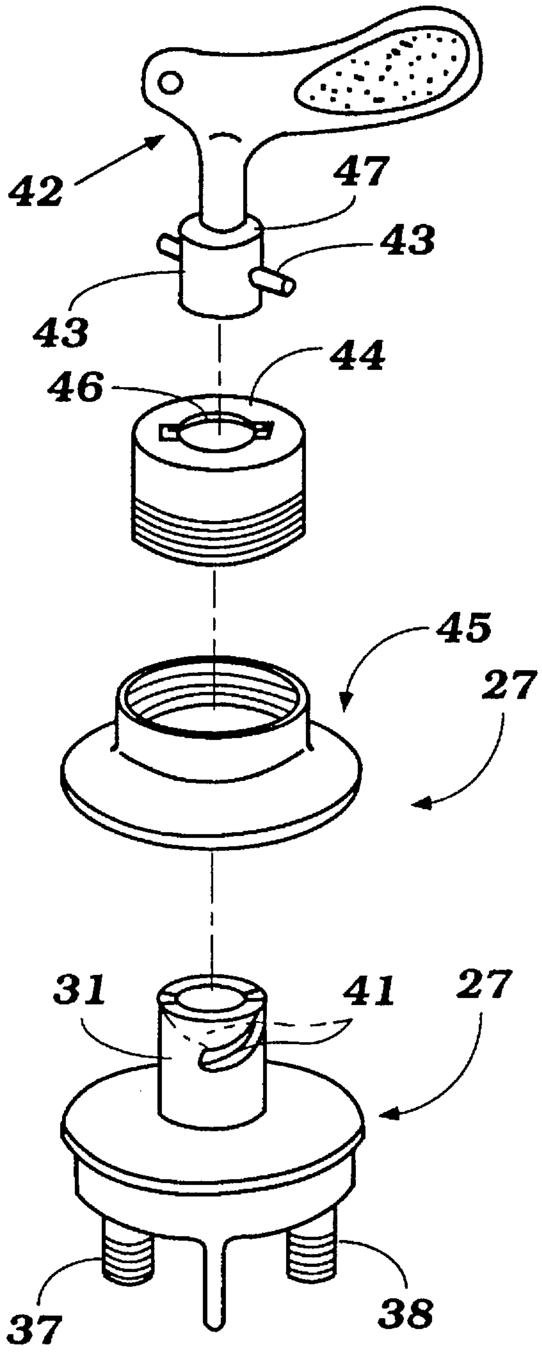
FIG. 4 is an exploded perspective view of the main switch.

Referring now in detail to the drawings and initially to the embodiment of FIGS. 1 and 2, a small personal watercraft constructed in accordance with this embodiment of the invention is identified generally by the reference numeral 11. The watercraft 11, as depicted, is one of many types of small personal watercraft that can utilize the invention. Therefore, the general description of the layout of the watercraft 11 is intended to be for purpose of illustration and it will be readily apparent to those skilled in the art how the invention can be utilized with a wide variety of types of personal watercraft.

The watercraft 11 is comprised of a hull, indicated generally by the reference numeral 12, and which is comprised of an underpart 13 and a deck 14. These parts 13 and 14 are formed from any suitable material such as a molded fiberglass reinforced resin or the like. The hull and deck parts 13 and 14 are connected to each other around their outer periphery in a suitable manner, and a bumper 15 may extend therearound.

The rear of the hull forms a passenger's area, indicated generally by the reference numeral 16, which is formed of an upstanding central portion 17 that accommodates a seat 18. The seat 18 is configured so as to accommodate one or more riders seated thereon in straddle fashion. Where more than one rider is accommodated, they are seated in tandem fashion. The seat 18, as will be described later, is movable relative to the portion 17 and defines a storage area therebeneath.

The hull has raised side areas 19 spaced outwardly of the seat raised portion 17 so as to accommodate the legs of the riders seated on the seat 18. This type of construction is well known in this art. The rider's area 16 is open through the transom of the hull so as to facilitate entry and exit from the body of water in which the watercraft 11 is operating.

The deck portion 14 is formed with an opening that is disposed forwardly of the seat 18 and which overlies an engine compartment in which a powering internal combustion engine, which appears in some of the later figures, is positioned. This engine drives a propulsion device, such as a jet propulsion unit (not shown), that is disposed in a tunnel formed under the raised seat portion 17. A hatch cover 21 is pivotally supported on the deck portion 14 by a hinge assembly for pivotal movement, in a manner which will be described later by reference to FIG. 10, to afford access to the engine compartment. In addition, a small storage compartment, indicated generally by the reference numeral 22, is provided in the hatch cover 21 and is closed by a removable cover 23. This cover 23 is also pivotally connected, as shown in FIG. 2, so as to afford access to the storage compartment 22. The cover 23 and cover 21 are provided with appropriate seals so that the storage compartment 22 will be substantially watertight.

Also carried by the hatch cover 21 is a handlebar control assembly, indicated generally by the reference numeral 24, which is connected for steering movement to the discharge nozzle of the jet propulsion device or other steering arrangement for steering of the watercraft 11, as is well known in this art. The handlebar assembly 24 includes a twist-grip throttle control and also a control switch box 25 that is affixed in a suitable manner to the handlebar assembly. The control switch box 25 carries suitable electrical control switches such as a starter switch, which will be described later, for actuating a starter associated with the engine for starting it. In addition, a kill switch is provided for selectively permitting the operator to disable the ignition system of the engine and stop it.

This kill switch also includes a safety cut-off feature that includes a cuff 26 that is designed so as to be worn around the wrist of the rider operator and connected to the kill switch by a cable. If the rider operator falls overboard, the cuff will pull away from the control box 25 and will cause the kill switch to be enabled to stop the engine of the watercraft, as is well known in this art.

The construction of the watercraft 11 as thus far described may be considered to be conventional, and for that reason components which are conventional have either been described only summarily above or will not be described at all. Where that is the case, the construction may be of any type known in the art.

Although this type of construction is generally satisfactory and very effective. It should be readily apparent that the operator may attempt to use the safety cuff 26 as a key for the system. This precludes operation of the watercraft by removing the safety cuff and the clip which couples it to the kill switch. Such an attempt can be easily disabled by manually inserting an appropriate tool or piece so as to disable or open the kill switch.

Also, the operation of the kill switch still leaves the battery in a condition where power can be drawn from it, and this is not desirable. In accordance with an important feature of the invention, therefore, the watercraft is provided with a key-operated main switch, which is indicated by the reference numeral 27 generally and which in this embodiment is contained within the storage compartment 22. The construction of the main switch 27 may be best understood by reference to FIGS. 3–6 and will now be described by particular reference to those figures.

The main switch assembly 27 is comprised of a lower or inner housing part 28 which is made up of a pair of interconnected members comprising a lower cup-shaped member 29 and a closure member 31 which are formed from a nonconductive material and which are rigidly connected to each other so as to define an internal cavity. This cavity terminates in a cylindrical portion 32 formed by an extending cylindrical sleeve of the cover 31. Inside of this cavity there is provided a slidably supported contact 33 that has a cylindrical portion 34 that is journaled for sliding movement within the cylindrical opening 32. There is a clearance provided in this area to permit smooth operation.

Figure 7:
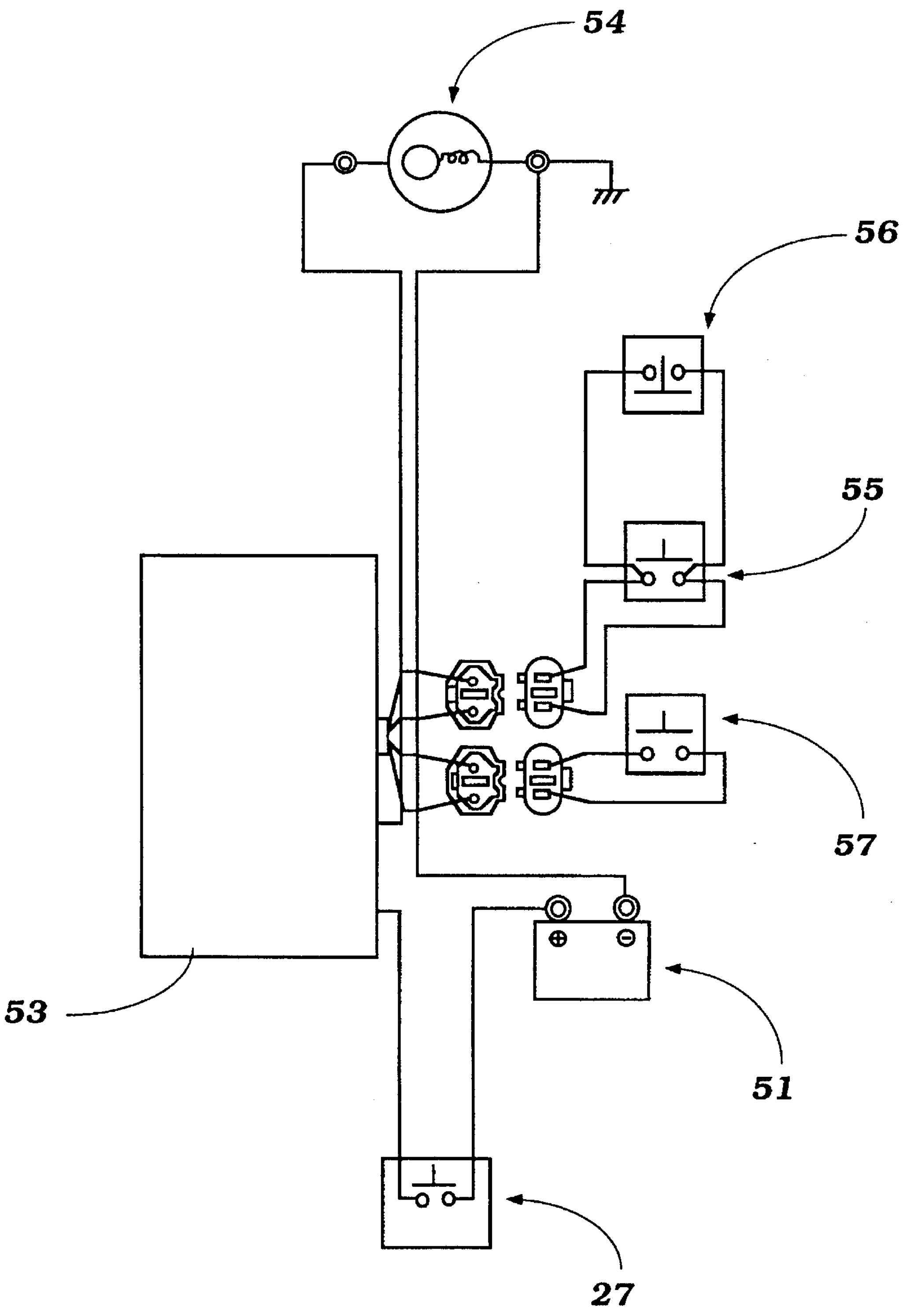
FIG. 7 is a schematic electrical diagram.

The contact 33 has a pair of posts 35 and 36 that are adapted to engage respective terminals 37 and 38 that extend through the cover piece 29. These terminals 37 and 38 can be connected to cables of an electrical circuit, which will be described later by reference to FIG. 7. A coil compression spring 39 is received between the contact 33 and the lower wall of the case portion 29 so as to normally urge the main switch 27 to its opened position, as shown in FIG. 5.

The upper end of the cylindrical part of the cover piece 31 is formed with a pair of diametrically opposed helical slots 41. A lock and key mechanism is provided with a cylindrical portion 47 that has a pair of cylindrical posts 43 that are received within the cylindrical portion of the cover piece 31 and in the slots 41. The key mechanism 42 is, in turn, inserted through a cover piece 44 that is affixed to the cover member 31 in a known manner. The cover piece 44 has internal threads to receive a threaded bezel 45 for affixing the switch assembly 27 to a panel of the hull, as shown in phantom lines in FIGS. 5 and 6.

Figure 5:
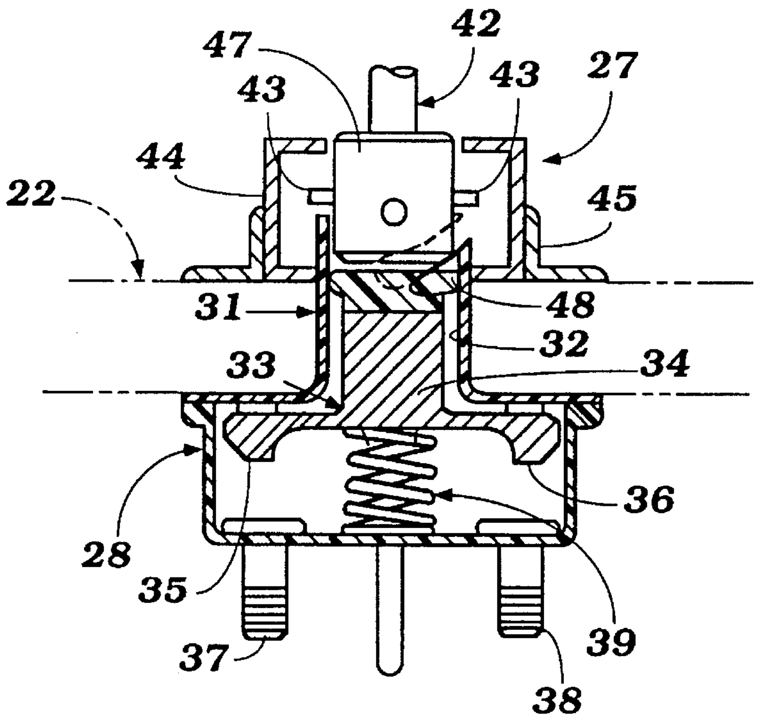
FIG. 5 is a cross-sectional view taken through the main switch and showing it in its off condition but with the key inserted.
Figure 6:
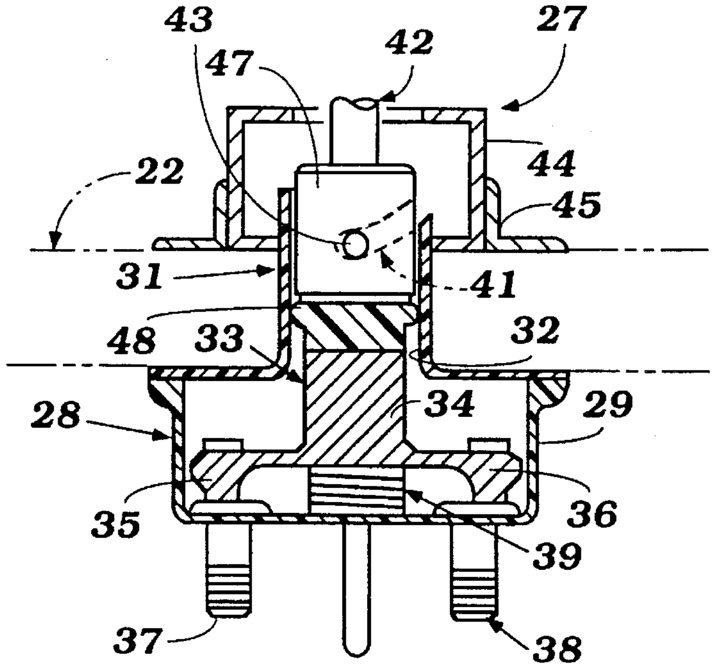
FIG. 6 is a cross-sectional view, in part similar to FIG. 5, and shows the main switch in its on position after the key has been turned.

The cover piece 44 has an opening 46 through which the key 42 and its cylindrical portion 47 and piece 43 may be inserted for rotating the lock and the pins 43 from the opened release position shown in FIG. 5 to the closed position shown in FIG. 6.

In order to provide a watertight seal, there is provided a slidably supported sealing element 48 that is interposed between the lower end of the key portion 47 and the cylindrical portion 34 of the terminal 33. In this way the switch assembly can be kept watertight. The key 42 carries a ring or chain 49 so that it can be attached to a key chain or the like, and the operator can, when shutting off the main switch 27, remove this key 42 for anti-theft protection.

A schematic electrical circuit for the arrangement is shown in FIG. 6. In this circuit, the battery is indicated generally by the reference numeral 51, and it is connected by means of the main switch 27 to a control circuit 53. The control circuit 53 connects the battery 51 to the various electrical components for the watercraft 11, and specifically to a starter motor 54, the ignition circuit (not shown), and various other components.

As may be seen, the emergency switch previously referred to operated by the cuff assembly 26 is depicted and identified generally by the reference numeral 55. This cooperates with the kill switch 56 and operates to shut off the ignition circuit via the control circuit 53. A starter switch 57 is also depicted, and it operates the starter motor 54 through the control circuit 53.

It should be readily apparent that when the main switch 27 is turned off, all battery power output is terminated, and hence drainage of the battery cannot occur, as will when the kill switch is energized or the safety switch 55 is operated so as to initiate the kill circuit.

Figure 8:
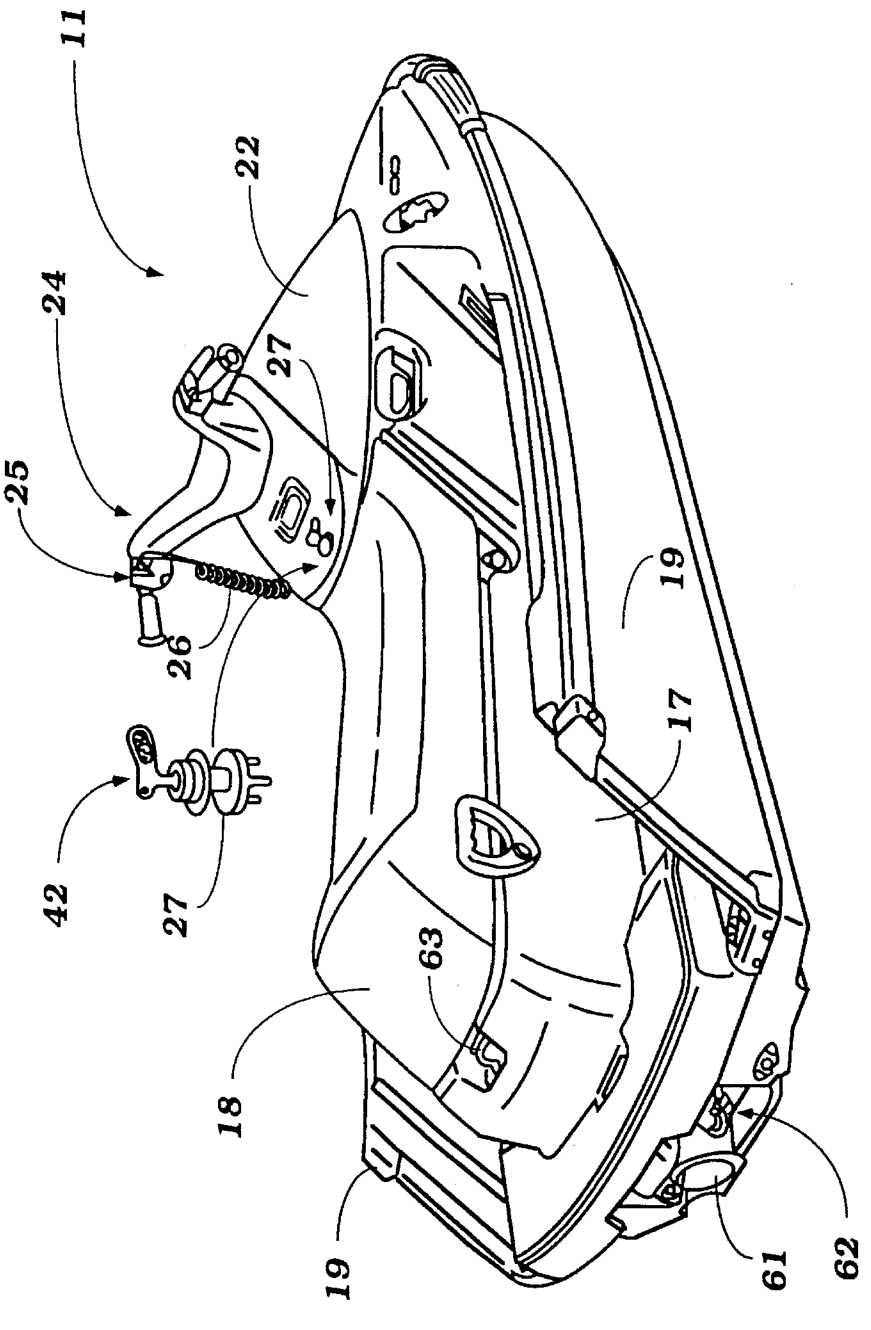
FIG. 8 is a perspective view, taken from the rear and to one side, showing another embodiment of the invention, with the main switch in position and also shown removed and enlarged to more clearly illustrate its construction.

In the embodiment thus far described, the key-operated master switch 27 has been located in the storage compartment 22 ahead of the steering handlebar assembly 24. FIG. 8 shows another alternative location wherein the main switch 27 is positioned immediately below the handlebar assembly 24 and forwardly of the seat 18. This places the switch 27 in a position wherein it more readily may be viewed by the operator, but offers less water protection. However, as has been noted, the switch itself 27 is watertight.

This figure also shows the steering nozzle 61 for the jet propulsion unit, which is positioned in the tunnel 62 aforereferred to. Also, this figure illustrates the latch 63 for holding the seat 18 in position.

Figure 9:
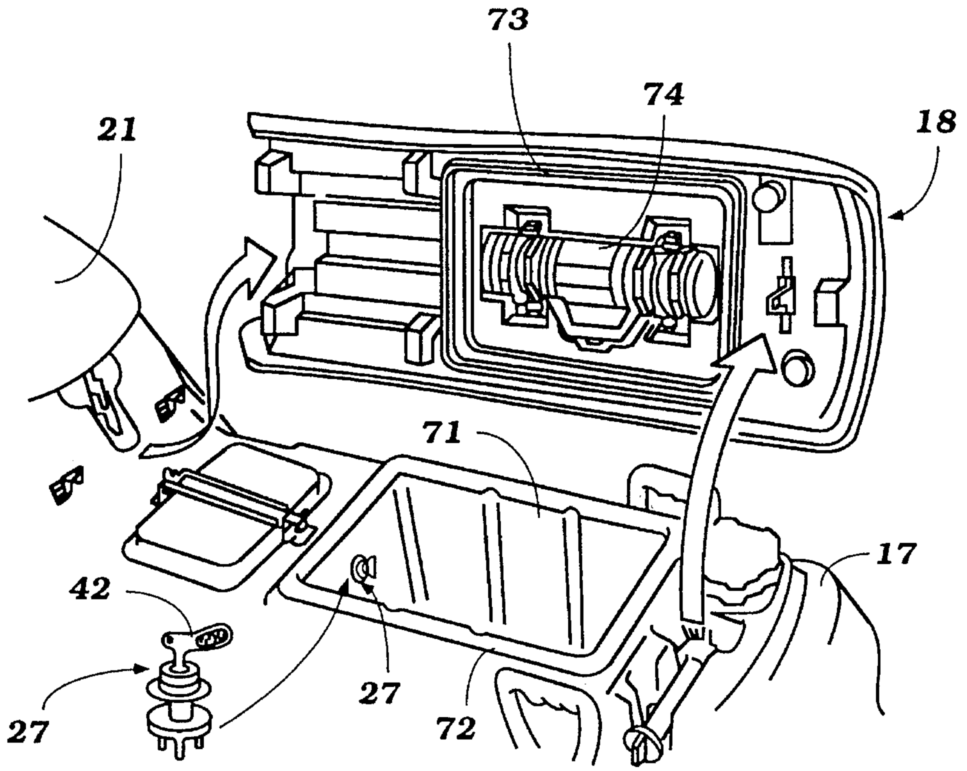
FIG. 9 is a perspective view showing another main switch location, with the closure member therefor opened and with the main switch in place and also shown removed and enlarged to more clearly illustrate its construction.

FIG. 9 shows another alternative location for the main switch 27 and one which provides additional water protection like the embodiment of FIGS. 1 and 2. In this embodiment, it is seen that the seat 18 may be removed from the portion 17 and access a further storage compartment 71 formed by the raised portion 17. The upper part of the storage compartment 71 is surrounded by a horizontal surface 72 that is adapted to be sealingly engaged by a seal 73 carried on the underside of the seat for watertight sealing of the compartment 71.

This figure also shows that a device such as a battery-powered flashlight 74 may be contained within the underside of the seat 18, but nevertheless within the sealed area surrounded by the seal 73.

In this embodiment, the key operated main switch 27 is mounted in the front wall of the storage compartment 71, but it equally well could be placed in the side or rear walls.

Figure 10:
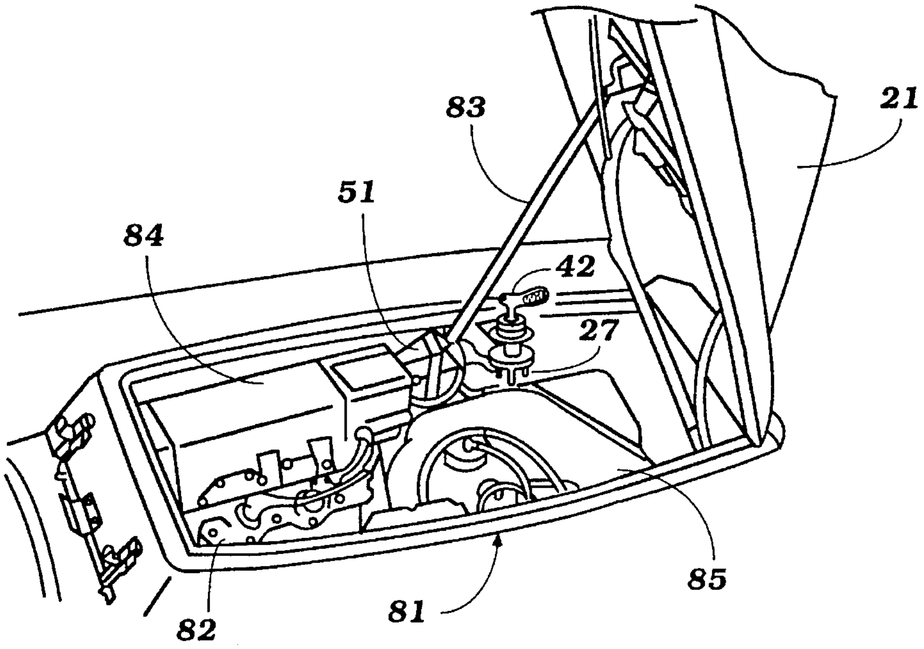
FIG. 10 is a perspective view showing another embodiment of the invention, with the access to the main switch opened.

FIG. 10 shows another embodiment of the invention, and in this embodiment the key operated main switch 27 is positioned in the engine compartment which, as has afore been noted, is covered by the hatch cover 21. The engine compartment is indicated generally by the reference numeral 81 in this figure, and it may be seen that the engine 82 is clearly accessible when the hatch cover 21 is pivoted open about its aforenoted forwardly positioned pivot point.

A support post 83 can be utilized to hold the hatch cover 21 in its opened position. The engine 82 is provided with an exhaust system that includes an expansion chamber 84 and which is disposed rearwardly of the battery 51 which is equally accessible through the engine compartment 81. Finally, a fuel tank, indicated generally by the reference numeral 85, is positioned forwardly of the engine 82 and also is accessible through the opened hatch cover 21. As may be seen, the main switch 27 may be mounted anywhere in the engine compartment in the range of easy access when the hatch cover 21 is open.

From the foregoing description it should be readily apparent that the described embodiments of the invention provide a very effective control switch for the electrical power of a small watercraft while retaining the safety switch. In addition, a watertight main switch is also provided which, coupled with the other watertight mountings, will ensure good integrity and long life for the system. Of course, the foregoing description is that of preferred embodiments of the invention, and various changes and modifications may be made without departing from the spirit and scope of the invention as defined by the appended claims.

I claim:

1. A control for a watercraft comprised of a hull having a passenger's area for accommodating a rider, a battery for supplying electrical power to said watercraft, a safety switch coupled to a rider for disabling a circuit from said battery if a rider leaves the passenger's area, a key operated water sealed main, switch positioned in an enclosed area and serving the sole function of controlling the transmission of electrical power from said battery to all electrically operated components of said watercraft and controlling said circuit and all other electrical circuits for precluding the supply of electrical power from said battery to said circuit and all other electrical circuits.

2. A control for a watercraft as in claim 1, wherein the key-operated main switch is waterproof.

3. A control for a watercraft as in claim 2, wherein the key-operated main switch is provided in a sealed watertight compartment of the hull.

4. A control for a watercraft as in claim 3, wherein the watertight compartment is accessible through a selectively openable cover.

5. A control for a watercraft as in claim 4, wherein the key-operated main switch is provided within a storage compartment concealed by a cover.

6. A control for a watercraft as in claim 1, wherein the safety switch is a cuff-type safety switch operated by a cable affixed to the body of the operator and which operates the kill switch of the engine if the operator leaves the passenger's area.

7. A control for a watercraft as in claim 6, wherein the key-operated main switch is waterproof.

8. A control for a watercraft as in claim 7, wherein the key-operated main switch is provided in a sealed watertight compartment of the hull.

9. A control for a watercraft as in claim 8, wherein the watertight compartment accessible through a selectively openable cover.

10. A control for a watercraft as in claim 9, wherein the key-operated main switch is positioned within the engine compartment and under a hatch cover.

11. A control for a watercraft as in claim 9, wherein the key-operated main switch is provided within a storage compartment concealed by a cover.

12. A control for a watercraft as in claim 11, wherein the storage compartment is provided under a removable seat contained in the passenger's area.

13. A control for a watercraft as in claim 1, wherein the key-operated main switch is comprised of a sealed outer housing defining an internal cavity containing a contact member and selectively engagable with a pair of terminals carried by the main cover, said main cover having a tubular portion in which a cylindrical part of the contact member is slidably supported, a sealing plunger slidably supported in said tubular portion and engaged with said contact member for operating said contact member between an engaged position and a released position, and a key-operated lock insertable within said tubular portion for operating said sealing member and said contact member for providing an electrical connection between said terminals.

14. A control for a watercraft comprised of a hull having a passenger's area for accommodating a rider, a battery for supplying electrical power to said watercraft, a safety switch coupled to a rider for disabling a circuit from said battery if a rider leaves the passenger's area, and a waterproof key-operated main switch for precluding the supply of electrical power from said battery to said circuit, said key-operated main switch being positioned within a sealed, watertight engine compartment of said hull and under a selectively openable hatch cover.

15. A control for a watercraft as in claim 14, wherein the safety switch is a cuff-type safety switch operated by a cable attached to the body of the operator and which operates the kill switch of the engine if the operator leaves the passenger's area.

16. A control for a watercraft comprised of a hull having a passenger's area for accommodating a rider, a battery for supplying electrical power to said watercraft, a safety switch coupled to a rider for disabling a circuit from said battery if a rider leaves the passenger's area, and a key-operated, waterproof main switch for precluding the supply of electrical power from said battery to said circuit, said key-operated main switch being provided in a sealed watertight storage compartment of said hull accessible through a selectively openable cover, said storage compartment being provided under a removable seat contained in the passenger's area.

17. A control for a watercraft as in claim 16, wherein the safety switch is a cuff-type safety switch operated by a cable attached to the body of the operator and which operates the kill switch of the engine if the operator leaves the passengers area.

* * * * *